T. CARENCE & E. W. SUMPTER.
HOSE COUPLING.
APPLICATION FILED OCT. 7, 1911.
1,149,727.
Patented Aug. 10, 1915.
2 SHEETS—SHEET 1.
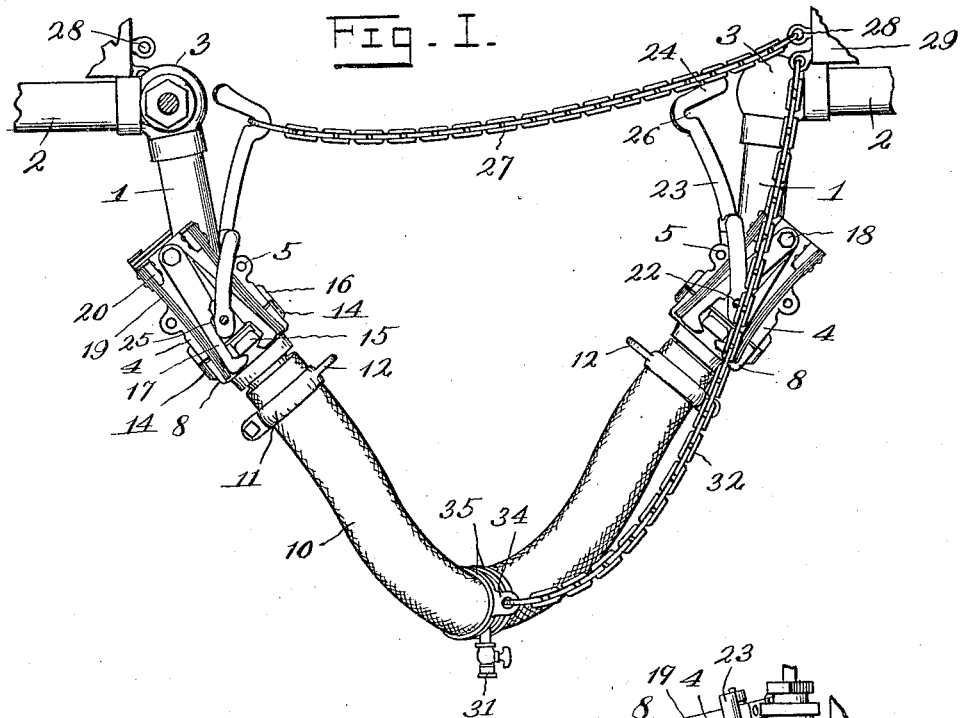
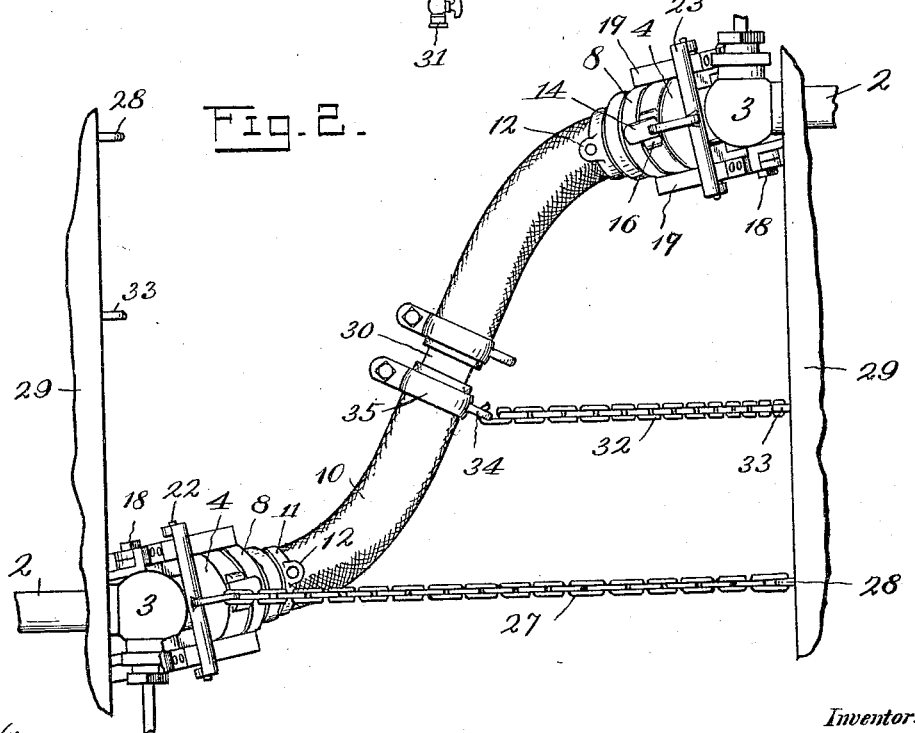
Witnesses:
R. E. Hamilton
E. C. Lillian
Inventors
T. Carence and E. W. Sumpter,
By F. G. Fischer, atty.
COLUMBIA PLANOGRAPH CO., WASHINGTON, D. C.

T. CARENCE & E. W. SUMPTER.
HOSE COUPLING.
APPLICATION FILED OCT. 7, 1911.
1,149,727.
Patented Aug. 10, 1915.
2 SHEETS—SHEET 2.
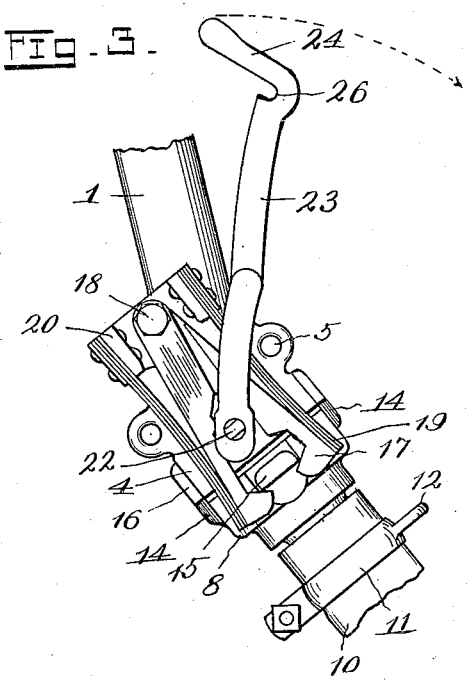
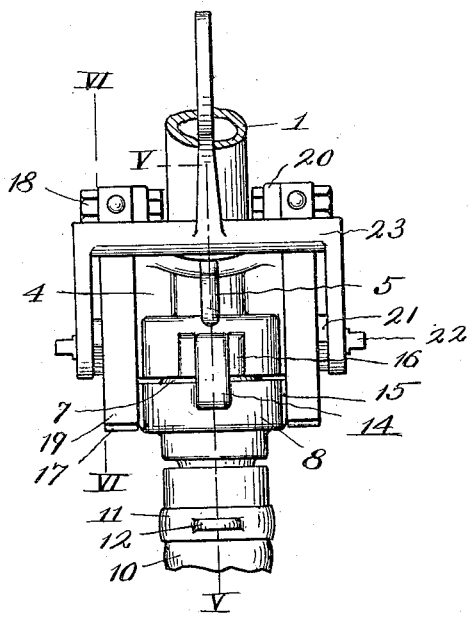
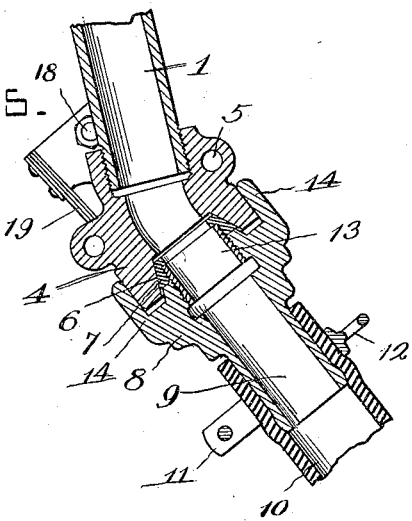
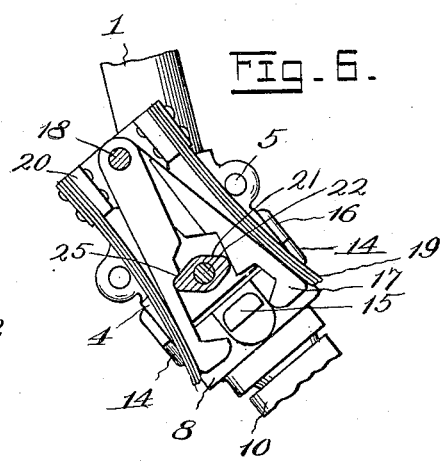

UNITED STATES PATENT OFFICE.

THOMAS CARENCE AND ERNEST W. SUMPTER, OF KANSAS CITY, MISSOURI.

HOSE-COUPLING.

1,149,727. Specification of Letters Patent. Patented Aug. 10, 1915.

Application filed October 7, 1911. Serial No. 653,409.

*To all whom it may concern:*

Be it known that we, THOMAS CARENCE and ERNEST W. SUMPTER, citizens of the United States, residing at Kansas City, in the county of Jackson and State of Missouri, have invented certain new and useful Improvements in Hose-Couplings, of which the following is a specification.

Our invention relates to that class of couplings especially adapted for coupling a hose to the line pipes of air-brake and steam-heating systems installed on railway cars, and our objects are to provide a coupling which will retain air or steam under pressure without leaking, one which can be readily coupled without requiring the operator to pass between the cars, and one which will automatically uncouple when the cars are uncoupled and drawn apart from each other.

In order that the invention may be fully understood, reference will now be made to the accompanying drawings, in which:

Figure 1 is a side elevation of the invention in operative position. Fig. 2 is a plan view of the same. Figs. 3 and 4 are side and front elevations, respectively, of our improved coupling. Fig. 5 is a longitudinal section on line V—V of Fig. 4, with the uncoupling lever, forming part of the invention, removed. Fig. 6 is a longitudinal section on line VI—VI of Fig. 4, with the uncoupling lever removed.

1—1 designate two short sections of pipe communicating with two line pipes 2—2 through the intermediacy of angle-valves 3—3. The line pipes 2—2 extend beneath the railway cars (not shown) for the purpose of conducting air to the air-brakes, or steam to the heating system installed on the cars.

Each pipe 1 is provided at its lower threaded end with a coupling member 4, having an eye 5 and a conical socket 6, which latter is adapted to receive a conical nozzle 7, at one end of a coupling member 8 having a tubular extension 9, which extends into the adjacent end of a hose 10, where it is firmly secured by a clamp 11, having an eye 12 at the upper side thereof. Hose 10 has a coupling member 8 at each end thereof, adapted to couple with member 4 on each of the pipes 1.

Nozzle 7 consists, preferably, of hard rubber, or like material to effect an air-tight joint between it and the wall of socket 6 when the two coupling members 4 and 8 are coupled together, as shown in Fig. 5. Nozzle 7 is removably secured to the forward end of coupling member 8, by means of a nipple 13, so that it may be readily removed when worn out, and another substituted therefor. Coupling member 8 is provided at its forward portion with a pair of oppositely-disposed forwardly-projecting guide-members 14, and a pair of oppositely-disposed laterally-projecting lugs 15.

Guide-members 14 are each adapted to pass between a pair of oppositely-disposed guide-members 16, on coupling member 4, and thus hold the lugs 15 in proper position to be engaged by two pairs of locking-jaws 17, pivotally-mounted upon bolts 18, engaging the vertical sides of the coupling-member 8.

Each pair of locking-jaws 17 is pressed toward each other and firmly into engagement with their respective lug 15, by means of a heavy pair of leaf-springs 19, secured at their rear ends to a pair of lugs 20, projecting laterally from the sides of the coupling member 4.

The two pairs of locking-jaws 17 are simultaneously spread apart (Fig. 6) by a pair of unlocking cams 21, to admit free passage of their respective lugs 15, when coupling or uncoupling the members 4 and 8. The unlocking cams 21 are mounted upon a pair of trunnions 22, projecting laterally from the coupling member 4, and said unlocking cams are fixed to the lower ends of a forked lever 23, the upper terminal 24 of which extends obliquely to the body of the lever for a purpose which will hereinafter appear. The forward movement of lever 23 is limited by the unlocking cams 21 contacting with shoulders 25 on the two lower locking-jaws, and the backward movement of said lever is limited by contacting with the adjacent pipe 1.

Lever 23 is provided at its upper portion with a notch 26, at the base of terminal 24, to receive one end of a cable 27, the opposite end of which is secured to an eye 28, on the transom 29 of one of the cars.

The hose 10 is in two sections connected at their adjacent ends by a nipple 30, provided at its underside with a drain-cock 31, for the purpose of draining off any condensed steam which may accumulate at the lower portion of the hose.

The lower portion of the hose is held from dragging upon the ground when one of the couplings is uncoupled, by a cable 32 attached at its ends to eyes 33 and 34, the former being secured to transom 29, and the latter being integral with a clamp 35, a pair of which are employed to secure the nipple 30 in the adjacent ends of the two hose sections. If preferred, the lower end of the cable 32 can be secured in eye 12 to support the hose when one of the couplings is uncoupled.

In practice, one end of the hose is preferably left permanently coupled to one of the short pipes 1, on one of the cars, so that when two cars come together, the free end of the hose may be grasped with both hands to readily effect the coupling of said free end to the short pipe 1 on the other car. In this way but one of the coupling members 8 need be handled instead of two coupling members, as is necessary with the old type of coupling. The chains 27 and 32 are secured to the car on which the hose is to be left, and when the cars are uncoupled and drawn apart from each other the hose is automatically uncoupled from one of said cars by chain 27 pulling the lever 23, to which it is attached, forward as indicated by the arrow, Fig. 3, the oblique terminal 24, of said lever, being arranged at such an angle that the cable is released therefrom immediately after uncoupling of the hose is effected.

Having thus described our invention what we claim and desire to secure by Letters Patent, is:

A hose coupling comprising a pair of members, one of said members having diametrically opposite lugs thereon, pairs of pivotally connected jaws on opposite sides of the other member, springs for forcing the jaws of each pair toward each other, shoulders formed on certain of the jaws, trunnions projecting from the sides of the jaw bearing member, and between the jaws of each pair, a pivoted yoke having cams fixed to the legs thereof, said cams pivotally engaging the trunnions and operable between the jaws, interlocking guides formed on the members to direct said lugs between the jaws for engagement thereby, and means for rocking the yoke, whereby the cams are actuated to spread the jaws to disengage said lugs the movement of the cams in one direction being limited upon contact with said shoulders.

In testimony whereof we affix our signatures in the presence of two witnesses.

THOMAS CARENCE.
ERNEST W. SUMPTER.

Witnesses:
F. G. FISCHER.
E. C. LILLIAN.

Copies of this patent may be obtained for five cents each, by addressing the "Commissioner of Patents, Washington, D. C."